UNITED STATES PATENT OFFICE.

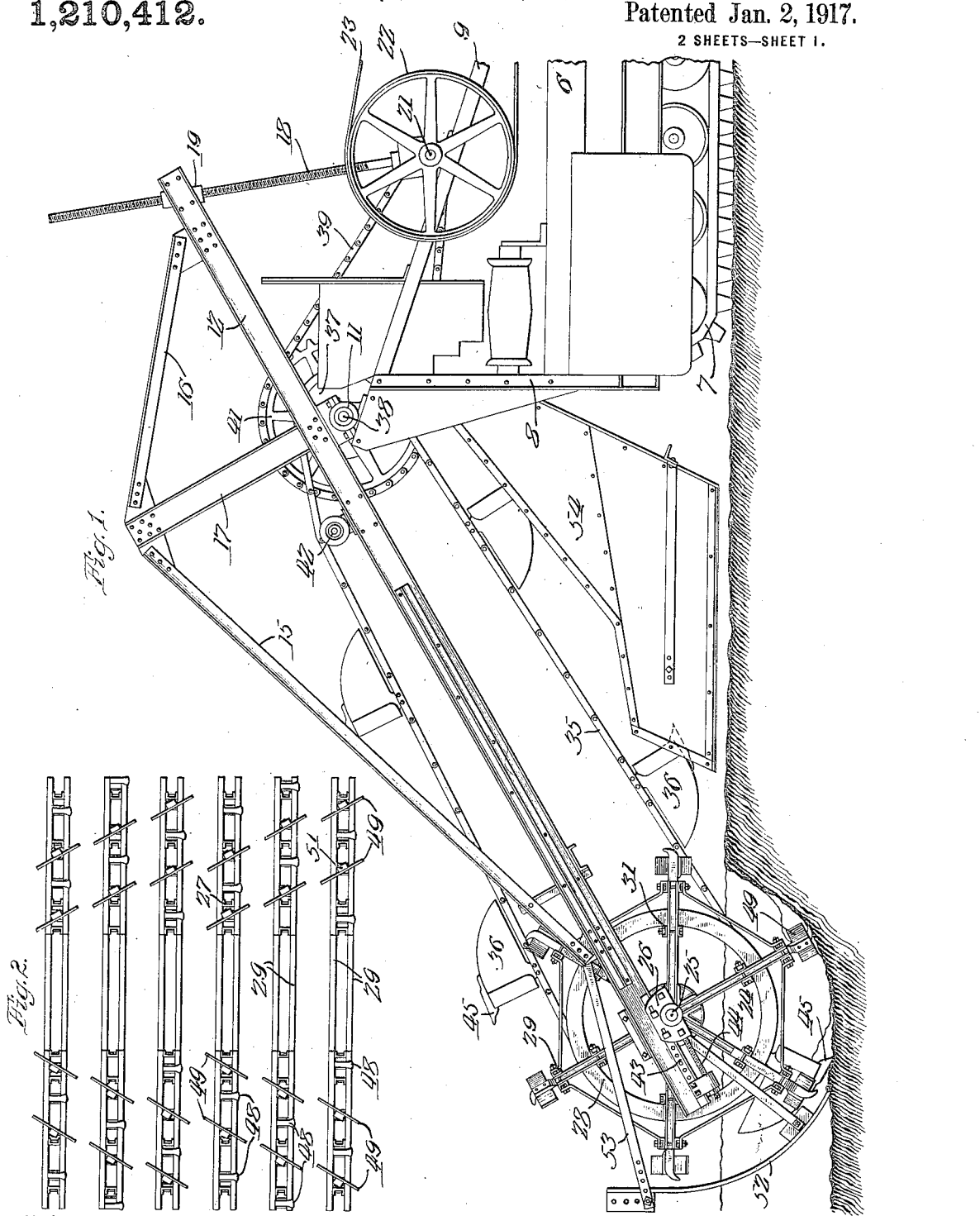

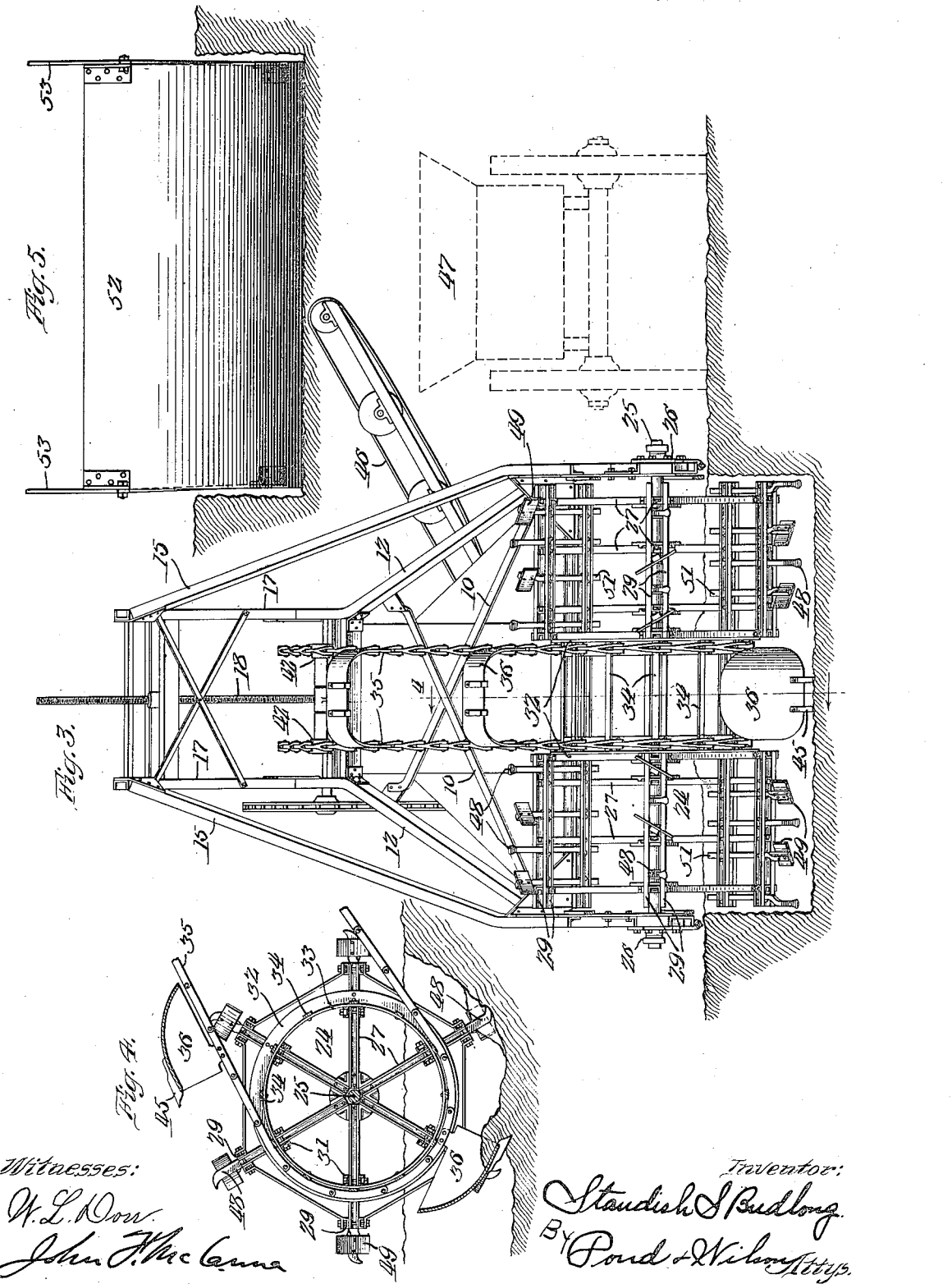

STANDISH S. BUDLONG, OF ROCKFORD, ILLINOIS.

EXCAVATING-MACHINE.

1,210,412. Specification of Letters Patent. Patented Jan. 2, 1917.

Application filed October 12, 1914. Serial No. 866,345.

*To all whom it may concern:*

Be it known that I, STANDISH S. BUDLONG, a citizen of the United States, residing at Rockford, in the county of Winnebago and State of Illinois, have invented certain new and useful Improvements in Excavating-Machines, of which the following is a specification.

My present invention while pertaining in general to excavating machines has more particular reference to machines adapted to automatically produce a cut or excavation of predetermined depth and width and automatically load the excavated material upon wagons or the like by means of which the material is carried away.

Ditching machines in which the actual excavating is done principally by the buckets carried on an endless conveyer have been used prior to my invention but, so far as I am aware, I am the first to provide a machine capable of making an excavation wider than the buckets and of uniform width throughout its entire depth without moving the buckets laterally back and forth in the excavation.

A machine embodying my invention is capable of producing a ditch or excavation of a uniform width greater than the width of the buckets by loosening the material to be excavated at each side of the buckets and moving the loosened material in the excavation into the path of travel of the buckets so that it will be picked up by the buckets and removed from the excavation.

One of the primary objects of this invention, therefore, is the provision of an excavating machine comprising an excavating tool adapted to loosen the material to be excavated and to move this loosened material into the path of the traveling conveyer buckets, thereby rendering possible the production of a cut or excavation much greater than it has been heretofore possible to make so that the machine is suitable for removing the surfaces of streets to any desired depth and is capable of producing in one operation an excavation of sufficient width and depth to accommodate the ties and ballast of a street railway.

Another object of the invention is to provide a novel excavating tool, which shall be equipped with excavating implements so constructed and mounted on the tool as to be capable of adjustment to any desired position and capable of being readily removed for purposes of repair or replacement.

Other objects and many of the advantages of my invention will be readily apparent as the same becomes better understood by reference to the following description when considered in connection with the accompanying drawings.

Referring to the drawings: Figure 1 is a fragmentary side elevation of an excavating machine embodying my present invention. Fig. 2 is a developed view of the surface of the cutting tool showing the arrangement of the implements thereon. Fig. 3 is a rear plan view of the machine shown in Fig. 1 with the shield or scraper removed. Fig. 4 is a transverse sectional view on the line 4—4 of Fig. 3 and Fig. 5 is a rear view showing the scraper or shield at the rear of the tool.

On the drawings and referring more particularly to Fig. 1 reference character 6 designates the rear end of the frame of a self propelled engine of any suitable construction. A caterpillar type of engine equipped with feet or tractor devices 7 is customarily used as this type of engine is capable of exerting the great tractive effort necessary to propel excavating mechanisms of this character. The rear end of the frame is equipped with uprights or standards 8 strengthened by suitable braces 9, and upon the upper ends of these uprights there is pivotally mounted on horizontal pivots 11 the main frame of the excavating mechanism. This frame comprises a plurality of separated side members 12 rigidly connected together by suitable cross braces 10, the rear ends of the members being additionally separated to accommodate between them an excavating tool of the required width, which in the present instance is considerably wider than the tractor frame. The side members are further strengthened and reinforced by means of struts 15 and 16 attached at one end to the uprights 17 and at their other ends to the side members adjacent their rear and forward ends, respectively. These struts and uprights brace and strengthen the side members vertically so that the frame is capable of carrying the excavating mechanism when the rear end of the frame is raised to inoperative position and is also capable of exerting the required downward pressure on the excavating tool when in operation. The frame is tilted on its pivot to raise and lower the rear end and is held in adjusted position by means of a threaded rod 18 threadedly engaged in a nut or collar 19 carried by the front end of the frame and capable of being rotated through suitable gearing (not shown) from the main drive shaft 21 of the machine to which power is applied from the engine through the fly-wheel 22 and the belt 23. Any suitable mechanism may be employed for connecting the rod 18 with and disconnecting it from the shaft 21.

The larger part of the cutting and loosening of the material to be excavated is performed by an excavating tool designated generally by reference character 24 carried by a horizontal shaft 25 journaled at its ends in bearings 26 adjustably mounted on the side members 12. The tool 24 which is substantially cylindrical in contour comprises a series of radial spokes 27 axially alined and connected by a plurality of outer and inner sets of clamping bars or members 29 and 31, respectively clamped together by suitable bolts. Two central rings, which I have designated by reference characters 32, connecting the center spokes are equipped with oppositely disposed inwardly extending flanges 33 which are connected together by means of slats or cross pieces 34. It will be observed that the spokes 27 extend radially some distance beyond the rings 32 so that the outer clamping bars 39 are disposed outside of the perimeter of the rings. The inner clamping members 31, preferably, extend longitudinally throughout the length of the tool, but the outer clamping members 29 extend inwardly from the ends of the tool only to the rings 32 so that a depressed raceway or groove is provided centrally of the tool between the rings 32. An endless conveyer comprising a pair of chains 35 connected by carrying buckets 36 is trained around the smaller central portion of the tool and also around a pair of sprocket wheels 37 fixed on a shaft 38 which is driven from the main shaft 21 by means of a sprocket chain 39 running over the sprocket wheel 41 and also a sprocket wheel on the shaft 21. Idlers 42 are preferably employed to direct and guide the upper lap of the conveyer during its travel. The conveyer travels in a counter clockwise direction viewing Fig. 1 and by reason of frictional engagement between the conveyer and the tool 24, the tool 24 is rotated on its axis. It will be observed, however, that the connection between the tool and the conveyer is frictional only so that in the event the tool should engage some immovable obstacle its rotation might be stopped without interfering with or injuring the machine. The bearing boxes 26 are adjusted longitudinally of the side members 12 on tracks 43 by means of adjusting screws 44 so that the tension of the conveyer may be regulated as desired. The conveyer buckets 36 are provided on their forward or cutting edges with cutting and digging teeth 45 adapted to loosen the material engaged thereby as the bucket travels around the tool so that the loosened material will be picked up by the buckets and carried upwardly and dumped upon the delivery apron 46 as the buckets travel around the sprocket 37. The end of this delivery apron 46 is adapted to deliver the excavated material at the side of the machine into the wagons 47 or other means for transporting it away from the excavation.

It will be observed that the excavating tool extends laterally a considerable distance on each side of the conveyer and in order that the tool may tear up and loosen material in the excavation and move the loosened material into the path of travel of the buckets 36, I have equipped the periphery of the tool with implements which will now be described. The implements consist of two species namely, the teeth or cutters 48 and the blades or removing members 49. Each blade is secured in an inclined position upon a rectangular stem or stock 51 and these stems are securely clamped in position between the clamping members 29 and 31, the teeth 48 being similarly clamped between the same members and preferably arranged in alternation with the blades. While any preferred arrangement of blades and teeth might be employed, I have found that very efficient and satisfactory results are obtained when the teeth and blades are arranged substantially as shown in Fig. 2, from which it will be observed that the teeth and blades alternate in each row axially of the tool and that the teeth and blades are disposed substantially in spiral rows upon the periphery of the tool. By loosening the clamping bolts which clamp the members 29 and 31 together the teeth and blades may be adjusted radially to extend any desired distance or may be readily removed for repair or replacement.

It will be observed that the extremities of the teeth extend radially to approximately the same distance as the extremities of the teeth 45 on the buckets 36 so that the excavation made by the buckets and by the teeth will be of substantially uniform depth. When the machine is in operation the center of excavation is cut by the buckets while at each side the material is torn up and loosened by the teeth 48 and the material thus loosened is moved by the inclined blades toward the center of the tool and into the path of travel of the conveyer buckets. Of course, the blades themselves assist somewhat in tearing up and loosening the material, although the teeth are relied upon principally for the tearing and loosening action, while the blades are designed to move the loosened material in the excavation into the path of the conveyer buckets by means of which it is removed.

For the purpose of leaving a clean bottom in the excavation I have provided a shield or scraper 52 carried by suitable rearwardly extending arms 53 at the rear of the tool, said scraper being adapted to travel along the bottom of the excavation, pick up the loosened material and carry it along so that it will eventually be taken up by the buckets. The buckets during their travel from the excavation to the point at which they dump on the apron necessarily lose considerable material which jiggles and drops off. For the purpose of preventing the scattering of this material I prefer to employ a chute or channel 54 beneath the conveyer into which the material will drop and from which it will subsequently be removed by the buckets.

It will be manifest from the foregoing that I have provided an excavating machine which is capable of producing an excavation of considerable width, that my improved excavating tool is adapted to tear up and loosen very hard material such as a macadam street and the like and that the loosened material is moved in the excavation into the path of travel of the conveyer buckets by means of which it is removed from the excavation. In operation the machine is moved slowly forward and the complete excavation of the required depth and width is made in one operation of the machine. The depth of cut may be readily adjusted as described and protection is afforded against breakage of the machine in case the tool should strike some immovable obstacle.

It is believed that my invention and its mode of operation will be readily understood without further description, and it should be obvious that the details of construction shown and described may be varied within considerable limits without departing from the spirit of the invention or sacrificing any of its material advantages.

I claim:

1. In an excavating machine, the combination of a cylindrical rotatable frame, comprising inner and outer longitudinally extending pairs of clamping members arranged in radial alinement, the inner clamping members extending substantially the entire length of the frame and the outer clamping members being terminated short of the central portion of the frame, an endless conveyer trained over the central portion of the frame intermediate said outer members and provided with a series of excavating buckets, and radially extending implements clamped between said inner and outer members for moving material in the excavation axially of the frame to the central portion thereof as the frame is rotated.

2. In an excavating machine, the combination of an excavator frame, an excavating tool rotatably mounted in said frame, said tool comprising a cylindrical frame consisting of radial members carrying longitudinally disposed members, a plurality of individual digging devices adjustably and detachably mounted in spaced relation on said longitudinally extending members, and a plurality of blades mounted on said longitudinally extending members in spaced relation with said digging devices and with respect to each other, the blades at one side of the center of said tool being disposed diagonally to the axis of the tool and the blades at the other side of the center of the tool being disposed diagonally to the axis of the tool but in the opposite direction so that upon rotation of the tool said blades will transport the material loosened by said digging devices toward the longitudinal center of the tool, an endless bucket-conveyer trained over the central portion of the cylindrical member, and means for operating said conveyer.

3. In an excavating machine, the combination of a frame, a cylindrical cage rotatably carried by said frame, said cage consisting of radial and longitudinally disposed members, a plurality of sharpened digging devices and elongated blades adjustably and detachably mounted upon said longitudinally extending members in spaced relation longitudinally and circumferentially of said cage, the blades at opposite sides of the transverse axis of said cage being disposed diagonally with respect to the cage and with respect to the blades at the opposite end, an endless conveyer trained around the center of said cage, and means for operating said conveyer.

4. In an excavating machine, the combination of a cylindrical rotatable frame comprising a shaft, a plurality of groups of radial, axially alined spokes secured to the shaft, and inner and outer clamping members connecting the alined spokes, the inner clamping members extending substantially throughout the length of the frame and the outer members terminating short of the center of the frame whereby to provide a raceway, radially extending excavating implements held rigidly between said clamping members and constructed and arranged to excavate and move material toward the raceway by rotation of the frame, and an endless conveyer trained around the race-way of the frame and provided with a series of excavating buckets for receiving the material moved thereto by said implements.

5. In an excavating machine, a cylindrical rotatable frame having inner and outer longitudinally extending pairs of clamping members arranged in radial alinement, a race-way disposed centrally between the ends of the frame within the outer clamping members, an endless conveyer trained over said race-way whereby to rotate the frame and equipped with a series of outwardly projecting buckets, and a plurality of radially extending implements clamped between the inner and outer pairs of clamping members and provided beyond the outer clamping members with means for excavating and moving material axially of the frame toward said buckets as the frame is rotated.

6. In an excavating machine, the combination with a pivotally mounted frame including separated side members, of a rotatable excavating tool comprising a shaft transversely disposed between said side members and journaled thereon adjacent to the outer end of the frame, a plurality of radially extending spokes secured to the shaft at longitudinally spaced intervals and arranged in longitudinal alinement, a pair of ring members co-axial with the shaft and secured to the spokes in spaced relation centrally between the side members, an endless conveyer trained around said ring members and provided with a series of outwardly projecting buckets, pairs of longitudinal clamping bars clamped within said ring members to opposite sides of the spokes and extending beyond the outer sides of said ring members to the ends of the excavating tool, other pairs of longitudinal clamping members disposed at the outer sides of said ring members spaced outwardly from and in axial alinement with the inner clamping members and being clamped to spokes, and a plurality of excavating implements clamped between the inner and outer pairs of clamping members at both sides of the endless conveyer and adapted as the tool is rotated to loosen material and move it axially of the frame to the conveyer buckets.

STANDISH S. BUDLONG.

Witnesses:
   John F. McCanne,
   Samuel N. Pond.